United States Patent
Goto

(10) Patent No.: US 11,259,177 B2
(45) Date of Patent: Feb. 22, 2022

(54) COMMUNICATION DEVICE, COMMUNICATION METHOD, AND STORAGE MEDIUM

(71) Applicant: CANON KABUSHIKI KAISHA, Tokyo (JP)

(72) Inventor: Fumihide Goto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/268,234

(22) Filed: Feb. 5, 2019

(65) Prior Publication Data

US 2019/0174310 A1    Jun. 6, 2019

Related U.S. Application Data

(63) Continuation of application No. PCT/JP2017/028410, filed on Aug. 4, 2017.

(30) Foreign Application Priority Data

Aug. 10, 2016 (JP) .............................. JP2016-157860

(51) Int. Cl.
*H04W 12/06* (2021.01)
*H04W 84/12* (2009.01)
(Continued)

(52) U.S. Cl.
CPC ........ *H04W 12/06* (2013.01); *G06K 7/10722* (2013.01); *G06K 7/1417* (2013.01);
(Continued)

(58) Field of Classification Search
CPC ... H04W 12/04; H04W 12/001; H04W 12/06; H04W 84/12; H04W 76/14;
(Continued)

(56) References Cited

U.S. PATENT DOCUMENTS 9,509,670 B2 * 11/2016 Balasingh ............. H04L 63/061
9,774,626 B1 * 9/2017 Himler ................ H04L 63/1433
(Continued)

FOREIGN PATENT DOCUMENTS

EP        2519071 A2    10/2012
EP        2991434 A1    3/2016
(Continued)

*Primary Examiner* — James R Turchen
(74) *Attorney, Agent, or Firm* — Canon U.S.A., Inc. IP Division

(57) ABSTRACT

A communication device obtains identification information and a public key of a first other communication device by a particular obtaining method that does not use a wireless LAN and notifies the first other communication device of a role of the first other communication device in a communication based on Wi-Fi Direct. In addition, the communication device obtains identification information and a public key of a second other communication device by the particular obtaining method and notifies the second other communication device of a role of the second other communication device in the communication based on Wi-Fi Direct. One of the notified roles is a P2P Group Owner and the other one is a P2P Client, and the communication based on Wi-Fi Direct can be performed between the first other communication device and the second other communication device based on the notifications.

13 Claims, 8 Drawing Sheets

(51) Int. Cl.
    *H04M 11/00*         (2006.01)
    *H04M 1/00*          (2006.01)
    *H04W 12/03*         (2021.01)
    *H04W 12/0433*     (2021.01)
    *G06K 7/10*          (2006.01)
    *G06K 7/14*          (2006.01)
    *H04L 67/104*      (2022.01)

(52) U.S. Cl.
    CPC .............. *H04M 1/00* (2013.01); *H04M 11/00* (2013.01); *H04W 12/03* (2021.01); *H04W 12/0433* (2021.01); *H04W 84/12* (2013.01); *H04L 67/104* (2013.01)

(58) Field of Classification Search
    CPC ........... H04W 12/04071; H04W 84/20; H04W 84/18; H04M 11/00; H04M 1/00; G06K 7/10722; G06K 7/1417; H04L 67/104; H04L 63/18
    See application file for complete search history.

(56) References Cited

U.S. PATENT DOCUMENTS

| | | | | |
|---|---|---|---|---|
| 10,419,424 B2* | 9/2019 | Pang | .................... | H04W 76/10 |
| 2006/0090067 A1* | 4/2006 | Edmonds | .............. | H04L 67/104 |
| | | | | 713/159 |
| 2008/0183853 A1* | 7/2008 | Manion | ............... | H04L 67/1093 |
| | | | | 709/223 |
| 2009/0268654 A1* | 10/2009 | Baglin | .................. | H04W 48/18 |
| | | | | 370/311 |
| 2010/0083121 A1* | 4/2010 | Famolari | ................. | H04L 69/18 |
| | | | | 715/736 |
| 2011/0026504 A1* | 2/2011 | Feinberg | ............... | H04W 8/186 |
| | | | | 370/338 |
| 2011/0085529 A1* | 4/2011 | Choi | ................ | H04L 29/08396 |
| | | | | 370/338 |
| 2011/0225305 A1* | 9/2011 | Vedantham | ............. | H04W 4/08 |
| | | | | 709/227 |
| 2012/0173620 A1* | 7/2012 | Holostov | ............ | H04L 67/1048 |
| | | | | 709/204 |
| 2012/0223132 A1* | 9/2012 | Lim | ......................... | G06K 9/78 |
| | | | | 235/375 |
| 2012/0233266 A1* | 9/2012 | Hassan | ................... | H04W 4/08 |
| | | | | 709/206 |
| 2012/0278389 A1* | 11/2012 | Thangadorai | ....... | H04L 67/1051 |
| | | | | 709/204 |
| 2013/0007442 A1* | 1/2013 | Mao | ..................... | H04L 9/3268 |
| | | | | 713/156 |
| 2013/0036231 A1* | 2/2013 | Suumaki | ............... | H04W 12/04 |
| | | | | 709/228 |
| 2013/0040576 A1* | 2/2013 | Yoon | ..................... | H04W 76/14 |
| | | | | 455/41.2 |
| 2013/0065627 A1* | 3/2013 | Jung | ................. | H04W 52/0241 |
| | | | | 455/515 |
| 2013/0339504 A1* | 12/2013 | Montemurro | ........... | H04L 41/28 |
| | | | | 709/223 |
| 2014/0044010 A1* | 2/2014 | Hiroshige | ............. | H04W 24/02 |
| | | | | 370/254 |
| 2014/0068719 A1* | 3/2014 | Kiukkonen | ........... | H04W 12/50 |
| | | | | 726/4 |
| 2014/0185602 A1* | 7/2014 | Goto | ..................... | H04W 8/005 |
| | | | | 370/338 |
| 2014/0206346 A1* | 7/2014 | Kiukkonen | ....... | H04W 52/0229 |
| | | | | 455/426.1 |
| 2014/0269646 A1* | 9/2014 | Ramasamy | ........... | H04W 12/50 |
| | | | | 370/338 |
| 2015/0229475 A1* | 8/2015 | Benoit | .................. | H04L 63/061 |
| | | | | 713/168 |
| 2015/0358820 A1* | 12/2015 | Li | ........................... | H04W 4/80 |
| | | | | 380/270 |
| 2016/0057215 A1* | 2/2016 | Rayanki | .............. | H04L 67/1048 |
| | | | | 709/228 |
| 2016/0087967 A1* | 3/2016 | Pang | ..................... | H04W 76/11 |
| | | | | 726/6 |
| 2016/0191501 A1* | 6/2016 | Li | ........................... | H04L 41/28 |
| | | | | 726/6 |
| 2016/0242030 A1* | 8/2016 | Pang | ..................... | H04L 9/0863 |
| 2016/0261760 A1* | 9/2016 | Aso | .................... | G03G 15/5004 |
| 2016/0270020 A1* | 9/2016 | Adrangi | .................. | H04L 67/02 |
| 2017/0238162 A1* | 8/2017 | Yasuda | ................... | H04W 84/20 |
| | | | | 370/329 |
| 2017/0257475 A1* | 9/2017 | Zong | .................... | H04L 12/185 |
| 2017/0357339 A1* | 12/2017 | Bathiche | ................ | G06F 3/038 |
| 2018/0020492 A1* | 1/2018 | Dao | ........................ | H04L 61/20 |
| 2018/0241570 A1* | 8/2018 | Pang | ........................ | H04L 9/08 |
| 2019/0014531 A1* | 1/2019 | Fang | ..................... | H04L 63/107 |

FOREIGN PATENT DOCUMENTS

| | | |
|---|---|---|
| EP | 3021605 A1 | 5/2016 |
| JP | 2005-065018 A | 3/2005 |
| JP | 2006-261938 A | 9/2006 |
| JP | 2012-222645 A | 11/2012 |
| JP | 2015-516715 A | 6/2015 |
| JP | 2016-076852 A | 5/2016 |
| JP | 2016-144002 A | 8/2016 |
| KR | 10-2013-0090300 A | 8/2013 |
| WO | 2016/072781 A1 | 5/2016 |
| WO | 2016/163103 A1 | 10/2016 |

\* cited by examiner

COMMUNICATION DEVICE, COMMUNICATION METHOD, AND STORAGE MEDIUM

CROSS-REFERENCE TO RELATED APPLICATIONS

This application is a Continuation of International Patent Application No. PCT/JP2017/028410, filed Aug. 4, 2017, which claims the benefit of Japanese Patent Application No. 2016-157860, filed Aug. 10, 2016, both of which are hereby incorporated by reference herein in their entirety.

TECHNICAL FIELD

The present invention relates to a communication device, a communication method, and a storage medium.

BACKGROUND ART

Wi-Fi Direct (registered trademark, which will be hereinafter referred to as WFD) corresponding to a technology for directly performing a communication based on a wireless LAN between communication devices without intermediation of an access point (hereinafter referred to as AP) is standardized in Wi-Fi Alliance serving as a wireless LAN industry group.

According to the WFD, the communication is performed when one of the communication devices that directly perform the wireless LAN communication operates as the AP. According to the WFD, a role of the device that operates as the AP will be referred to as P2P Group Owner (hereinafter, referred to as GO). On the other hand, a role of the device that participates in a network generated by the GO will be referred to as P2P Client (hereinafter, referred to as CL). According to the WFD, a communication parameter necessary for participating in the network generated by the GO is shared between the devices by transmitting the communication parameter from the GO to the CL, and thereafter, the wireless communication according to the WFD is executed on the basis of the shared communication parameter.

To prevent leakage of the shared communication parameter to the other devices that do not perform the communication of the WFD, it is considered to more safely share the communication parameter by using a public key encryption method. Here, a public key necessary for using the public key encryption method needs to be more safely shared between the devices.

PTL 1 discloses a technology for a mobile terminal to simply and also safely obtain information of an access point by using a function for reading a QR code (registered trademark).

CITATION LIST

Patent Literature

PTL 1 Japanese Patent Laid-Open No. 2006-261938

According to the technology of PTL 1, it is possible to more safely obtain the public key by reading the QR code. However, to perform the communication of the WFD by using such a method, at least one of the devices needs to be provided with a distinct function for enabling the method. For example, in the above-described example, at least one of the devices needs to be provided with the function for reading the QR code, and the devices that are not provided with the function for reading the QR code were not able to perform the communication based on the WFD using the above-described method.

In view of the above, an object of the present invention is to enable even the devices that are not provided with the distinct function for obtaining the public key to start the communication of the WFD by sharing the communication parameter.

SUMMARY OF INVENTION

A communication device according to the present invention includes first obtaining means for obtaining identification information and a public key of a first other communication device by a particular obtaining method that does not use a wireless LAN, first notification means for notifying the first other communication device of a role of the first other communication device in a communication based on Wi-Fi Direct in accordance with the obtainment by the first obtaining means, second obtaining means for obtaining identification information and a public key of a second other communication device by the particular obtaining method, and second notification means for notifying the second other communication device of a role of the second other communication device in the communication based on Wi-Fi Direct in accordance with the obtainment by the second obtaining means, in which one of the roles notified by the first notification means and the second notification means is a P2P Group Owner and the other one is a P2P Client, and the communication based on Wi-Fi Direct is enabled between the first other communication device and the second other communication device based on the notifications.

Further features of the present invention will become apparent from the following description of exemplary embodiments with reference to the attached drawings.

DESCRIPTION OF EMBODIMENTS

First Embodiment

Hereinafter, a communication device according to an example of an embodiment of the present invention will be described in detail with reference to the drawings. An example using a wireless LAN system in conformity to IEEE 802.11 series will be described hereinafter, but a communication mode is not necessarily limited to the wireless LAN in conformity to IEEE 802.11. In addition, a technical scope of the present invention is confirmed by the scope of the claims and is not intended to be limited by the following individual embodiments.

Figure 1:
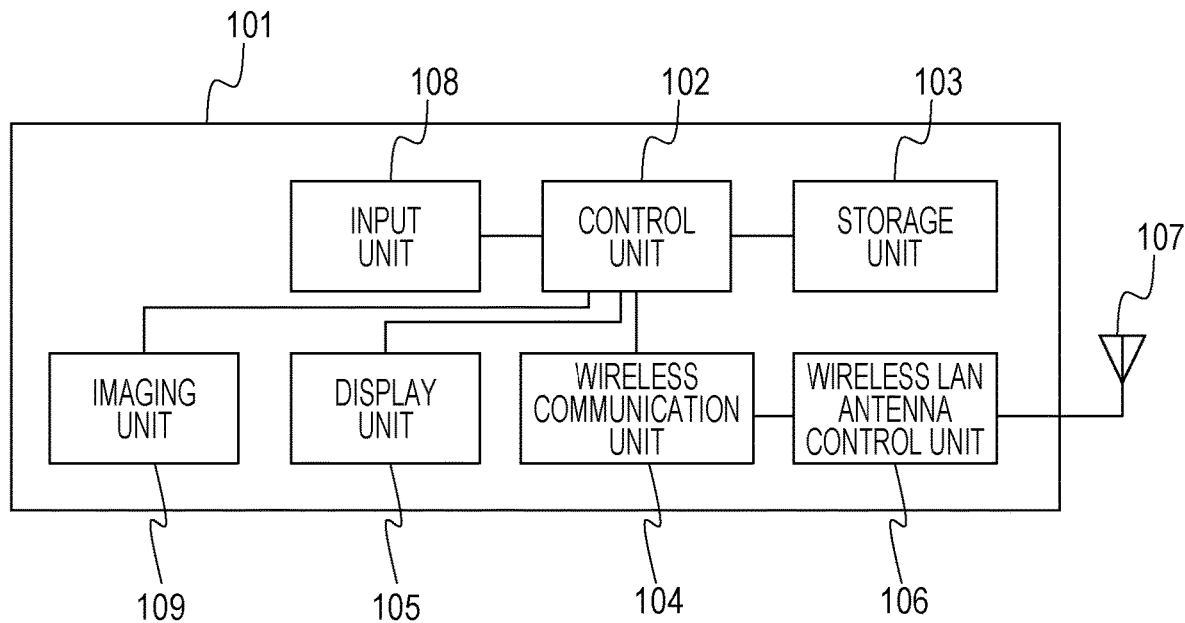
FIG. 1 is a hardware block diagram of a setting device.

FIG. 1 is a hardware block diagram representing an example of a configuration of a setting device, which will be described below, according to the present embodiment. 101 denotes an entire device. 102 denotes a control unit that controls the entire device by executing a control program stored in a storage unit 103. The control unit 102 is constituted by one or more CPUs (Central Processing Unit), for example. The control unit 102 also performs a setting control on a communication parameter with another device. 103 denotes the storage unit that stores the control program executed by the control unit 102 and various types of information such as the communication parameter. Various operations which will be described below are performed when the control program stored in the storage unit 103 is executed by the control unit 102. The storage unit 103 is constituted by a storage medium such as a ROM, a RAM, an HDD, a flash memory, or a detachably attachable SD card, for example.

104 denotes a wireless communication unit configured to perform a wireless communication such as a wireless LAN in conformity to the IEEE 802.11 series. A wireless communication unit 104 is constituted by a chip that performs a wireless communication. The wireless communication includes a short-range wireless communication such as, for example, Near Field Communication (registered trademark) (which will be hereinafter denoted as NFC). 105 denotes a display unit that performs various displays and has a function enabling output of information, which can be visually recognized by the user, such as an LCD or an LED, or sound output such as a speaker. The display unit 105 is provided with a function for outputting at least one of the visual information or the sound information. Display of the QR code is also executed by the display unit 105. With regard to the QR code, in addition to the display through the display unit 105, the QR code may be affixed to a casing of the communication device in the form of a sticker or the like, or may also be affixed to an instruction manual or a package such as cardboard at the time of sale of the communication device. 106 denotes a wireless LAN antenna control unit, and 107 denotes a wireless LAN antenna. 108 denotes an input unit for the user to perform various inputs and the like and operate the communication device. 109 denotes an imaging unit functioning as reading means by capturing the QR code or the like.

Figure 2:
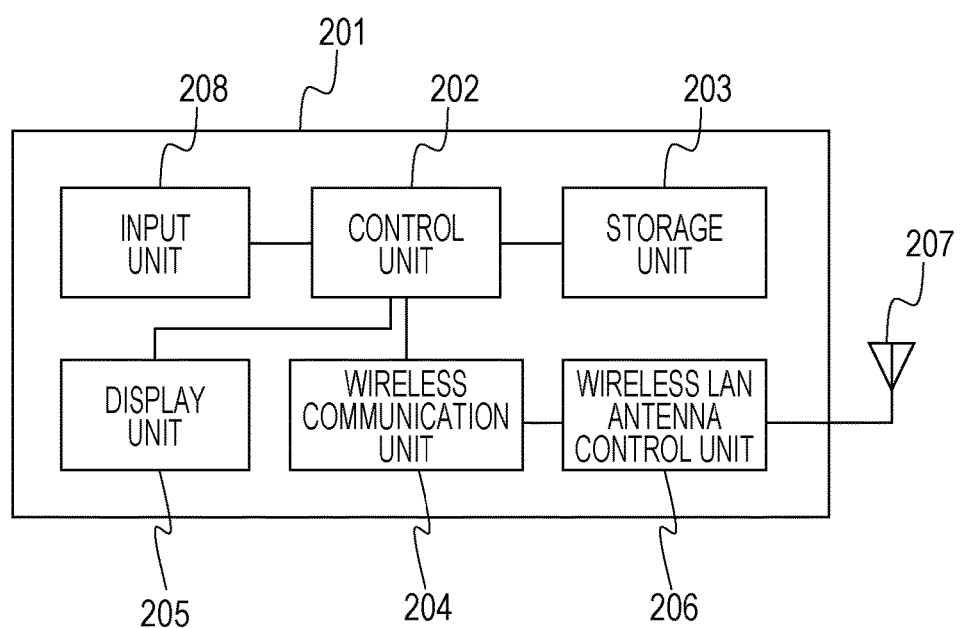
FIG. 2 is a hardware block diagram of a communication device.

FIG. 2 is a hardware block diagram representing an example of a configuration of a communication device which will be described below according to the present embodiment. 201 denotes an entire device. 202 denotes a control unit that controls the entire device by executing a control program stored in a storage unit 203. The control unit 202 is constituted by one or more CPUs, for example. The control unit 202 also performs a setting control on a communication parameter with another device. 203 denotes the storage unit that stores the control program executed by the control unit 202 and various types of information such as the communication parameter. Various operations which will be described below are performed when the control program stored in the storage unit 203 is executed by the control unit 202. The storage unit 203 is constituted by a storage medium such as a ROM, a RAM, an HDD, a flash memory, or a detachably attachable SD card, for example.

204 denotes a wireless communication unit configured to perform a wireless communication such as a wireless LAN in conformity to the IEEE 802.11 series. The wireless communication unit 204 is constituted by a chip that performs a wireless communication. The wireless communication includes a short-range wireless communication such as, for example, NFC. 205 denotes a display unit that performs various displays and has a function enabling output of information, which can be visually recognized by the user, such as an LCD or an LED, or sound output such as a speaker. The display unit 205 is provided with a function for outputting at least one of the visual information or the sound information. Display of the QR code is also executed by the display unit 205. With regard to the QR code, in addition to the display through the display unit 205, the QR code may be affixed to a casing of the communication device in the form of a sticker or the like or may also be affixed to an instruction manual or a package such as cardboard at the time of sale of the communication device. 206 denotes a wireless LAN antenna control unit, and 207 denotes a wireless LAN antenna. 208 denotes an input unit for the user to perform various inputs and the like and operate the communication device. It should be noted that the configuration illustrated in FIG. 1 is an example, and the communication device may also include another hardware configuration. For example, in a case where the communication device is a printer, the communication device may also include a printing unit in addition to the configuration illustrated in FIG. 1. In addition, in a case where the communication device is a camera, the communication device may also include a capturing unit.

Figure 3:
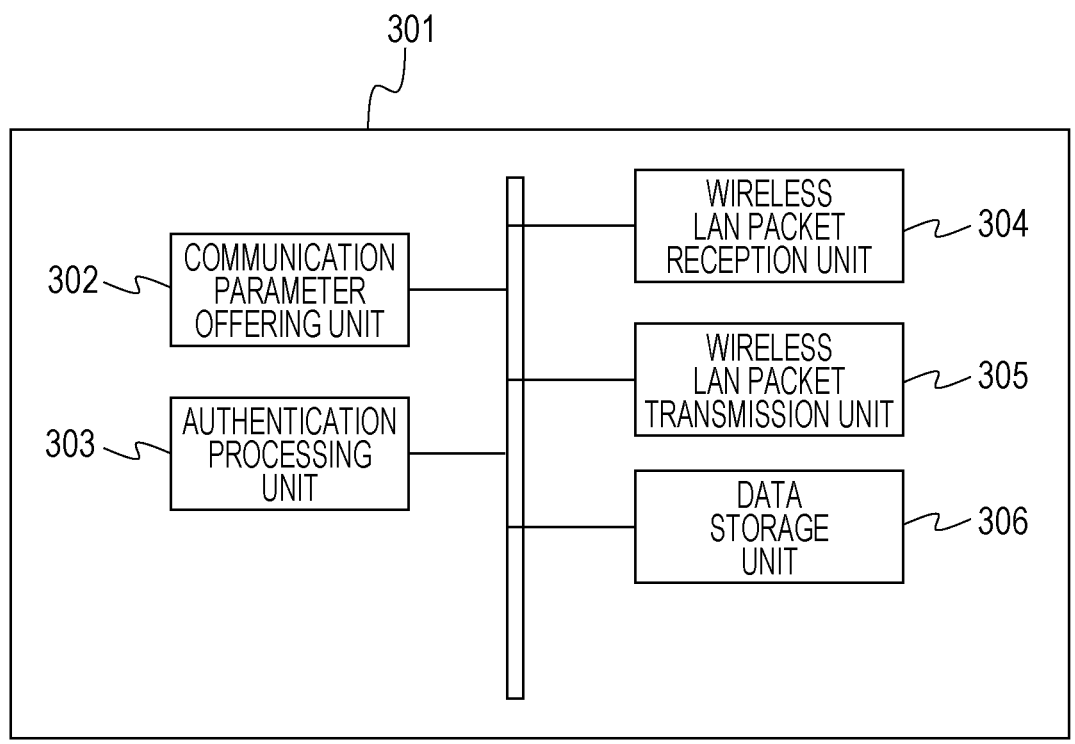
FIG. 3 is a software function block diagram of the setting device.

FIG. 3 is a block diagram representing an example of a configuration of a software function block of a setting device that executes a communication control function which will be described below. According to the present embodiment, the function blocks of the respective communication devices are stored in the corresponding storage unit 103 as programs, and the functions are executed when the programs are executed by the control unit 102. The control unit 102 realizes the respective functions when control on each hardware and calculation and process of information are performed in accordance with the control programs. Part or all of blocks included in these function blocks may be converted into hardware. In this case, part or all of blocks included in the respective function blocks are constituted by an ASIC (Application Specific Integrated Circuit), for example.

301 denotes an entire software function block. 302 denotes a communication parameter offering unit. The communication device becomes a communication parameter offering source and executes generation or encryption of the communication parameter, offering an opposed device the communication parameter, or the like. Parameter offering processing which will be described below is executed by the communication parameter offering unit 302. 303 denotes an authentication processing unit that executes authentication processing with the opposed device by using the QR code information or the like obtained by the communication device. Authentication processing of the setting device which will be described below is executed by the authentication processing unit 303. 304 denotes a wireless LAN packet reception unit and 305 denotes a wireless LAN packet transmission unit, and the wireless LAN communication is executed with the opposed devices in conformity to the IEEE 802.11 standard. 306 denotes a data storage unit that stores and holds software itself and information such as a wireless LAN parameter, authentication information, and sorts of barcodes. The above-described function block is an example, a plurality of function blocks may constitute a single function block, or any of the function blocks may be separated into a block that performs a plurality of functions.

Figure 4:
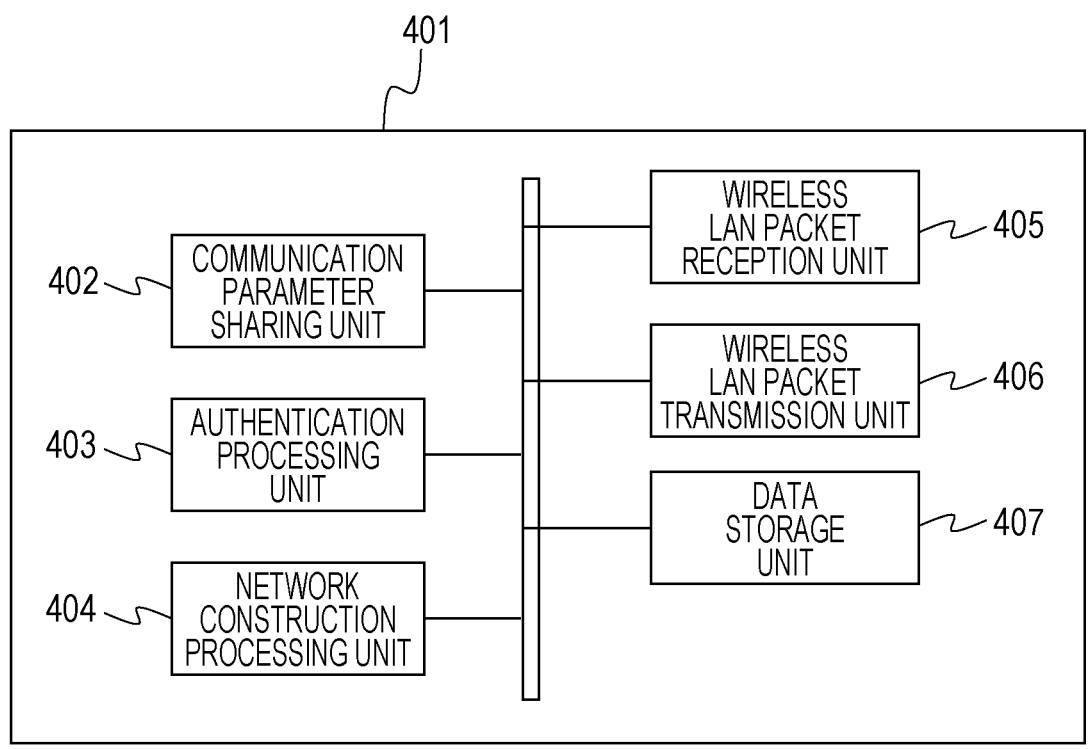
FIG. 4 is a software function block diagram of the communication device.

FIG. 4 is a block diagram representing an example of a configuration of a software function block of the communication device that executes the communication control function which will be described below. According to the present embodiment, the function blocks of the respective communication devices are stored in the corresponding storage unit 203 as programs, and the functions are executed when the programs are executed by the control unit 202. The control unit 202 realizes the respective functions when control on each hardware and calculation and process of information are performed in accordance with the control programs. Part or all of blocks included in these function blocks may be converted into hardware. In this case, part or all of blocks included in the respective function blocks are constituted by the ASIC, for example.

401 denotes an entire software function block. 402 denotes a communication parameter sharing unit that executes offering or reception processing of the communication parameter, encryption processing of the communication parameter and decryption processing of the encrypted communication parameter, and the like. The parameter offering processing and the parameter reception processing which will be described below are executed by the communication parameter sharing unit 402. 403 denotes an authentication processing unit that executes authentication processing with the opposed device by using information or the like included in the received message. The authentication processing of the communication device which will be described below is executed by the authentication processing unit 403. 404 denotes a network construction processing unit that executes construction or participation processing of the wireless LAN network by using the received communication parameter. The network construction processing and the network participation processing which will be described below are executed by the network construction processing unit 404. 405 denotes a wireless LAN packet reception unit, 406 denotes a wireless LAN packet transmission unit, and the wireless LAN communication in conformity to the IEEE 802.11 standard is executed with the opposed devices. 407 denotes a data storage unit that stores and holds software itself and information such as a wireless LAN parameter, authentication information, and sorts of barcodes. It should be noted that the above-described function block is an example, and a plurality of function blocks may constitute a single function block, or any of the function blocks may be separated into a block that performs a plurality of functions.

Figure 5:
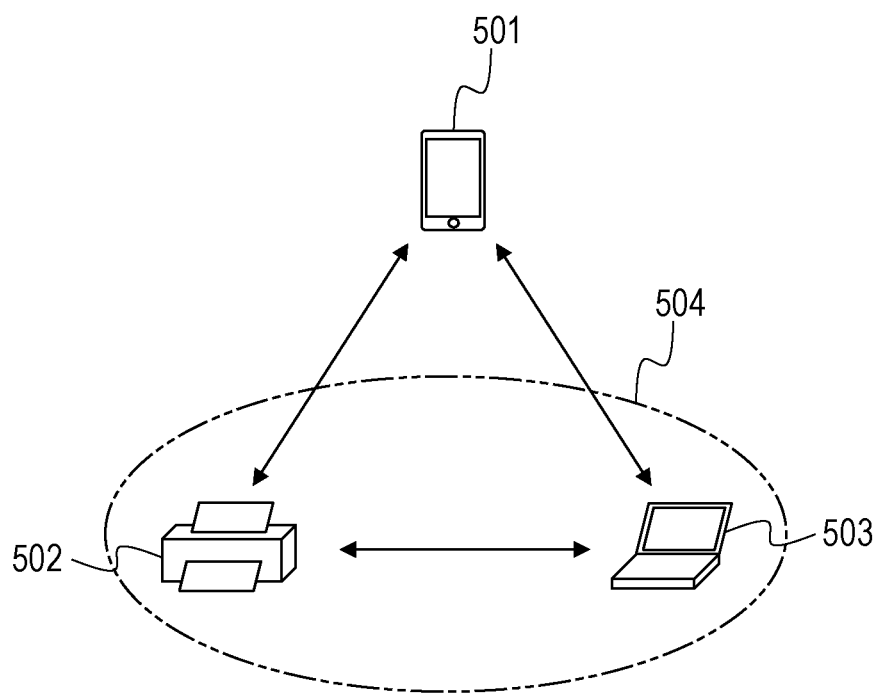
FIG. 5 illustrates an example of a system configuration according to an embodiment.

FIG. 5 is a system configuration according to the present embodiment which illustrates a smart phone 501, a printer 502, a laptop PC 503, and a wireless LAN 504 (which will be hereinafter referred to as the network 504).

According to the present embodiment, the smart phone 501 serving as the setting device reads the QR codes of the printer 502 and the laptop PC 503 serving as the communication devices and notifies each of the communication devices of a role in the communication based on the WFD. One of the notified roles is the GO and the other one is the CL. The printer 502 and the laptop PC 503 which are notified of the corresponding roles of the GO and the CL operate in accordance with the notified roles, and the communication based on the WFD is started between the printer 502 and the laptop PC 503. The smart phone 501 is one example of the setting device, and the setting device may also be other various devices such as, for example, a printer, a camera, a PC, a digital television set, various digital consumer electronics, and a wearable device. In addition, the printer 502 and the laptop PC 503 are one example of the communication device and may also be other various devices such as, for example, a smart phone, a camera, a digital television set, various digital consumer electronics, and a wearable device.

It should be noted that the setting device is one type of the communication device, but according to the present embodiment, a communication device provided with a function for obtaining a public key of another communication device by a specific obtaining method that does not use the wireless LAN will be referred to as a setting device to be distinguished from the communication device that is not provided with such a function. On the other hand, a communication device that is not provided with such a function will be simply referred to as a communication device. As described above, according to the present embodiment, the smart phone 501 is one example of the setting device, and the printer 502 and the laptop PC 503 are one example of the communication device. In addition, according to the present embodiment, the public key obtaining method using the QR code is an example of the above-described particular obtaining method. In this case, a function for reading the QR code is an example of a function for obtaining the public key of the other communication device by the particular obtaining method. Other examples of the particular obtaining method may also be NFC, Bluetooth (registered trademark), or a wireless communication other than the wireless LAN. In this case, an example of the function for obtaining the public key of the other communication device by the particular obtaining method includes an NFC reader/writer function.

According to the present embodiment, the smart phone 501 serving as the setting device has the configuration of FIG. 1 and FIG. 3 described before. In addition, the printer 502 and the laptop PC 503 serving as the communication device have the configuration of FIG. 2 and FIG. 4 described before.

Figure 6:
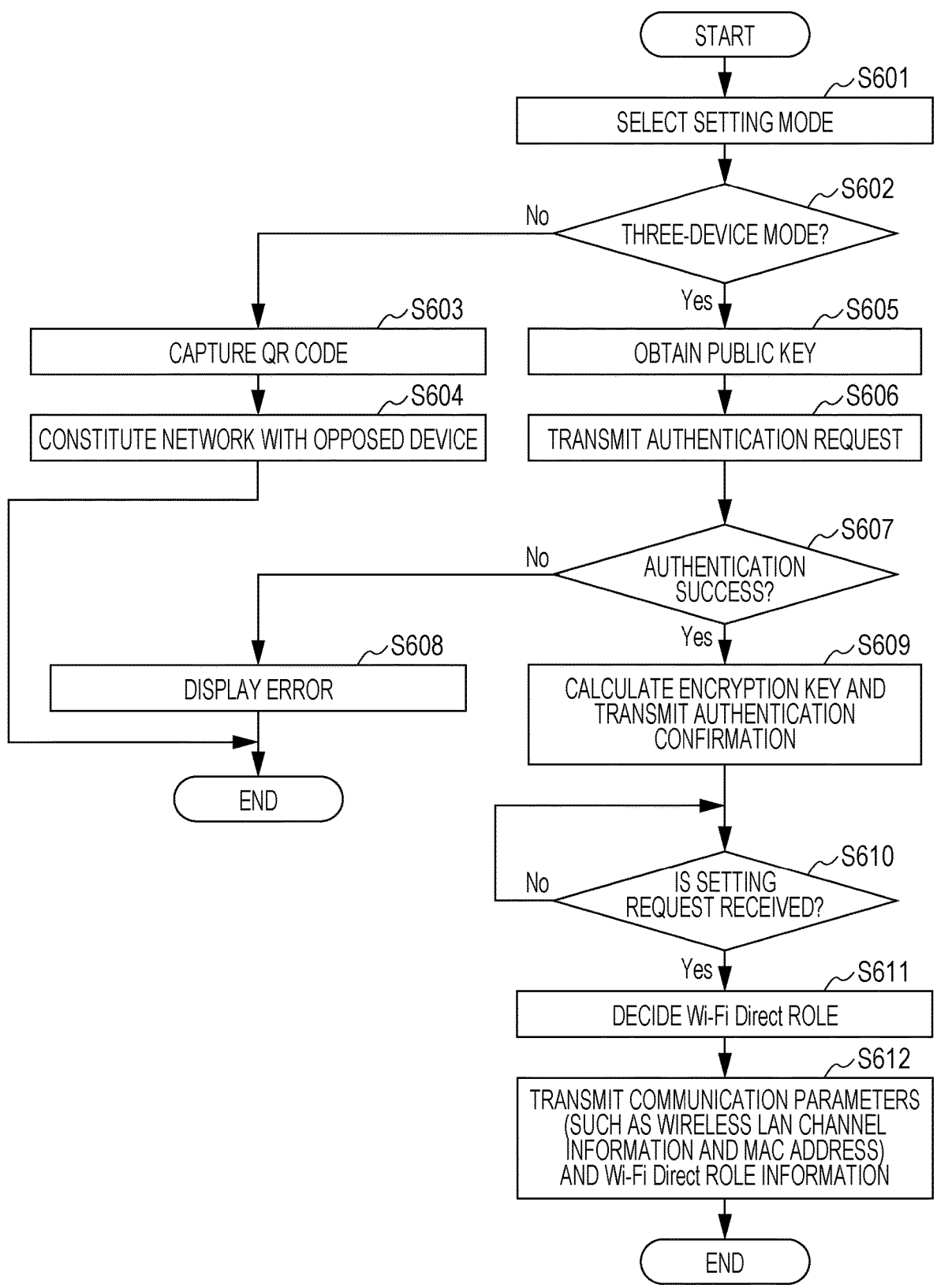
FIG. 6 is an operation flow chart of the setting device according to the embodiment.

FIG. 6 is a flow chart illustrating processing executed by the smart phone 501. FIG. 6 is started by the control unit 102 when the processing start is instructed by a user operation via the display unit 105 and the input unit 108. In addition, the respective steps in FIG. 6 are performed when the control unit 102 reads out and executes the computer program stored in the storage unit 103.

After the processing is started, the smart phone 501 asks the user to advance the processing as a "two-device mode" or advance the processing as a "three-device mode" via the display unit 105 and the input unit 108 (S601). Herein, the "two-device mode" refers to a mode in which the smart phone 501 constitutes the network by the smart phone 501 and another communication device. On the other hand, the "three-device mode" refers to a mode in which the smart phone 501 uses the smart phone 501 to constitute the network by two devices including a first other communication device and a second other communication device.

The smart phone 501 determines while of the modes is selected, and in a case where the two-device mode is selected (No in S602), a QR code of an opposite device that constitutes the network together with the smart phone 501 is read (S603). Then, the smart phone 501 performs processing of sharing the communication parameter with the opposite device by using the information obtained from the read QR code, and thereafter, constitutes the network together with the opposite device (S604). Specifically, in S603, the smart phone 501 obtains the public key of the opposite device and the identification information of the opposite device from the read QR code. Then, the smart phone 501 shares the communication parameter with the opposite device by the public key encryption method using the public key. Furthermore, the smart phone 501 may constitute the wireless network by executing the WFD with the opposite device in a case where the two-device mode is selected.

In a case where the three-device mode is selected in the determination in S602 (Yes in S602), the smart phone 501 reads the QR code of the other communication device (for example, the printer 502). Then, the smart phone 501 obtains the public key of the other communication device and the identification information of the other communication device from the read QR code (S605). The identification information of the other communication device may be a MAC address, a UUID, and the like, and the information obtained from the QR code may also include information other than these. After the public key is obtained, the smart phone 501 calculates a hash value of the obtained public key and transmits an authentication request including the hash value to the other communication device (S606). Herein, in a case where an address of the other communication device is identified by the read QR code, the smart phone 501 may specify the address and transmit the authentication request by unicast. In a case where the address of the other communication device is not identified, the authentication request may be transmitted by broadcast.

In a case where the authentication request includes a correct hash value and authentication processing is successful, the smart phone 501 receives an authentication response indicating the authentication success from the other communication device (Yes in S607). On the other hand, in a case where the authentication processing is failed because a wrong hash value is included, for example, the smart phone 501 receives an authentication response indicating the authentication failure from the other communication device (No in S607). Alternatively, in a case where a response to the authentication request is not returned for a certain period of time, the smart phone 501 determines that the authentication processing is failed. In such a case, the smart phone 501 displays an error on the display unit 105 and notifies the user of the processing failure to end the processing (S608).

When the authentication response indicating the authentication success is received (Yes in S607), the smart phone 501 calculates an encryption key using the public key encryption method and transmits an authentication confirmation to the other communication device (S609). The smart phone 501 and the other communication device are put into a state in which a shared key used for the subsequent encryption processing are held together by the authentication processing. After the authentication confirmation is transmitted, the smart phone 501 waits for a setting request transmitted from the other communication device (S610).

When the setting request is received from the other communication device, the smart phone 501 decides a role of the other communication device in the communication based on the WFD (S611). As a role decision method, the roles in the WFD are decided in accordance with an order in which the QR codes are read. That is, the smart phone 501 decides an opposite device of which the QR code has been read earlier after the "three-device mode" is selected in S602 as the GO. Then, an opposite device of which the QR code has been read later is decided as the CL. After the roles of the other communication devices are decided, the smart phone 501 notifies the other communication devices of the decided roles and the communication parameters used by the other communication devices to execute the WFD as a setting response (S612). The information transmitted in S612 is encrypted by the encryption key shared between the other communication devices. The communication parameters notified herein include information of an encryption method used by the communication of the WFD, an encryption key, an authentication method, and an authentication key. In addition, a network identifier (for example, an SSID) of the WFD constructed by a plurality of the other communication devices that have received the communication parameters is included. Furthermore, information of a wireless channel used in the communication of the WFD (for example, information such as 1 ch, 2 ch, or 3 ch in a 2.4 GHz band) may also be included. In addition to the communication parameter, as the information of which the other communication devices are notified in S612, identification information indicating the other communication device of which the roles in the WFD and the communication parameters have been already transmitted in S612 and the public key of the other communication device may also be included.

After the above-described processing is executed, the smart phone 501 ends the processing. The decision method for the role in the WFD in S611 is not limited to the above-described method, and the opposite device of which the QR code has been read earlier may be set as the CL, and the opposite device of which the QR code has been read later may be set as the GO, for example. In addition, the information notified in S612 may be only the roles in the WFD decided in S611. However, if notification of the communication parameters used for the communication of the WFD is performed in S612, the processing for the GO to decide the communication parameter when the other communication devices execute the WFD can be omitted thereafter. In addition, if notification of the communication channel is performed, since a search of all the channels for searching for the opposite device when the other communication devices execute the WFD is avoided thereafter, the search processing can be simplified. Similarly, if notification of the identification information indicating the other communication device is performed, the processing for searching for the opposite device when the other communication devices execute the WFD can be simplified thereafter.

Figure 7:
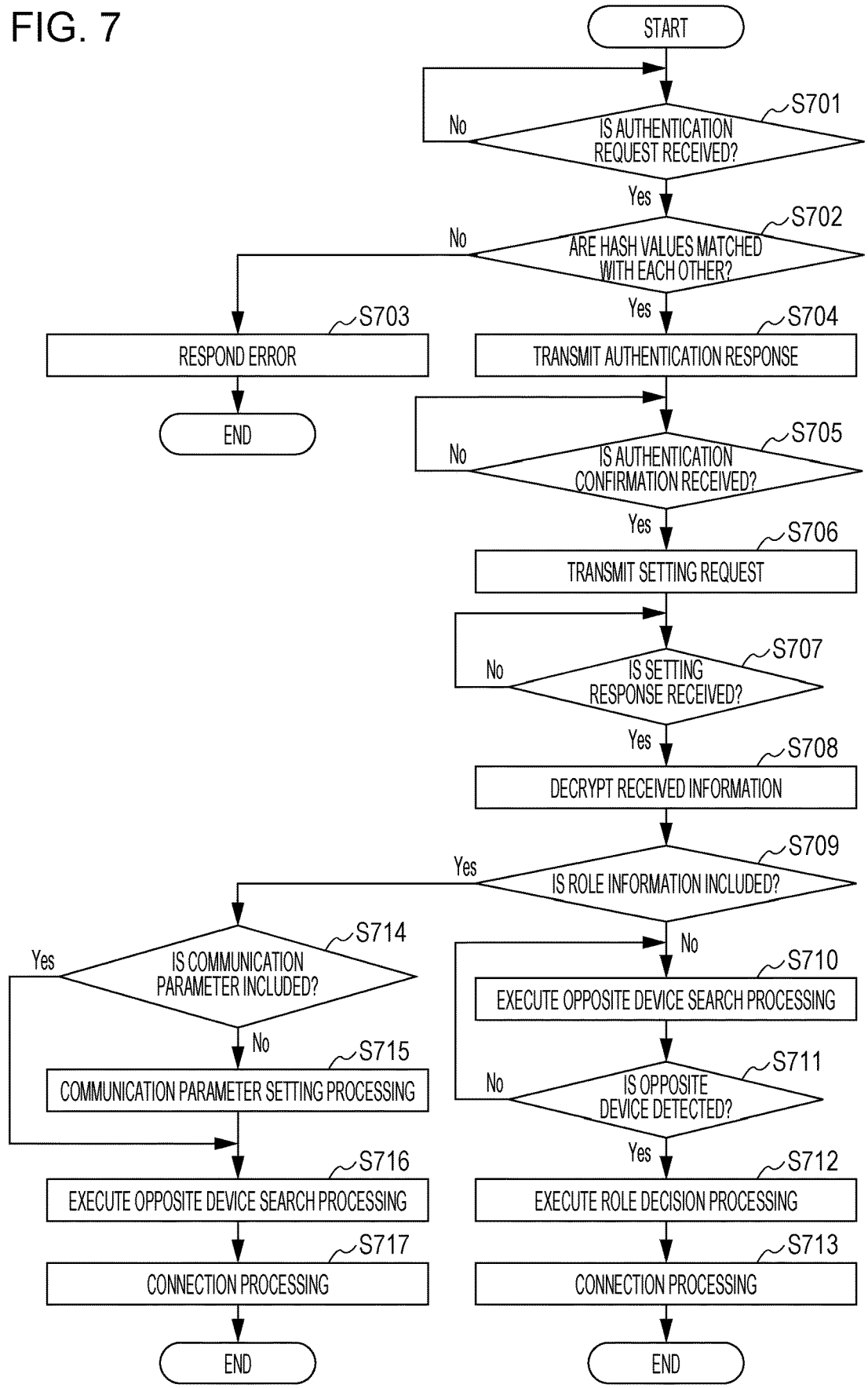
FIG. 7 is an operation flow chart of the communication device according to the embodiment.

FIG. 7 is a flow chart illustrating processing executed by the printer 502 or the laptop PC 503 (which will be hereinafter referred to as a communication device). According to the present embodiment, FIG. 7 is started by the control unit 102 when the wireless LAN communication function of the communication device is activated at a timing such as power input of the device. FIG. 7 may also be started by the control unit 102 when processing start is selected by the user operation via the display unit 105 and the input unit 108. Alternatively, in the case of the device having the function for displaying the QR code on the display unit, FIG. 7 may also be started when the QR code is displayed on the display unit. FIG. 7 is performed when the control unit 102 reads out and executes the computer program stored in the storage unit 103.

After the processing is started, the communication device waits for the authentication request transmitted from the setting device (S701). In a case where the authentication request is received (Yes in S701), the communication device checks whether or not the hash value included in the authentication request is matched with the hash value of the public key information held by the communication device (S702). In a case where the hash values are not matched with each other (No in S702), the communication device transmits the authentication response indicating that the authentication is failed to the setting device and ends the processing illustrated in FIG. 7 (S703). In S703, the communication device may also display an error on the display unit 205. In addition, after the communication device transmits the authentication response in step 703, the communication device may wait for the authentication request again by returning to S701 without ending the processing. In that case, this repeating processing may also continue for a predetermined period of time. In a case where the hash values are matched with each other (Yes in S702), the communication device transmits the authentication response indicating that the authentication is successful to the setting device (S704) and waits for the authentication confirmation transmitted from the setting device (S705).

In a case where the authentication confirmation is received (Yes in S705), the communication device transmits the setting request to the setting device (S706) and waits for the setting response (S707). In a case where the setting response is received (Yes in S707), the communication device decrypts the encrypted information included in the setting response by using the encryption key (S708).

The communication device checks the decrypted information and determines whether or not the information indicating the role in the WFD is included therein (S709). In a case where it is determined that the role in the WFD is included, the communication device determines whether or not the communication parameter is included in the decrypted information (S714). In a case where it is determined that the communication parameter is not included, to execute the communication based on the WFD with the other communication device, the communication device sets the communication device as the role notified from the setting device and executes setting processing of the communication parameters with the other communication device (S715). The setting processing of the communication parameters is similar to the processing executed in S701 to S708, and in S715, these processes are performed with the other communication device serving as a WFD communication partner instead of the setting device. By the setting processing of the communication parameters in S715, the communication parameters encrypted by the mutually shared encryption key are presented from the GO to the CL, and the communication parameters are set in the respective devices that execute the WFD. In a case where it is determined in S714 that the communication parameter is included or after the processing in S715 is ended, the communication device searches for the opposite device that executes the WFD (S716). Then, the communication based on the WFD is executed with the opposite device found as a result of the search on the basis of the set communication parameters (S717). In the search processing in S716, in a case where the identification information of the other communication device is included in the information received from the setting device, the search is performed in which this identification information is specified. In addition, in a case where the information of the wireless channel used in the communication of the WFD is included in the information received from the setting device, the search processing is executed by searching for only this wireless channel without searching for all the channels.

On the other hand, in a case where it is determined in S709 that the role in the WFD is not included in the decrypted information, the communication device executes the search processing of the opposite device (S710). At this time, the "two-device mode" is selected in the setting device instead of the "three-device mode". Therefore, as a result of the search processing in S710, the communication device finds the setting device as the opposite device (S711). When the opposite device is found in S711, the role decision processing of the WFD is executed with the found opposite device (S712). Specifically, Group Owner Negotiation standardized in the WFD is executed between the communication device and the setting device to decide which one becomes the GO and which one becomes the CL.

Thereafter, the communication parameters are provided from the device operating as the GO to the device operating as the CL, and the connection processing based on the WFD is completed by using the communication parameters (S713).

Figure 8:
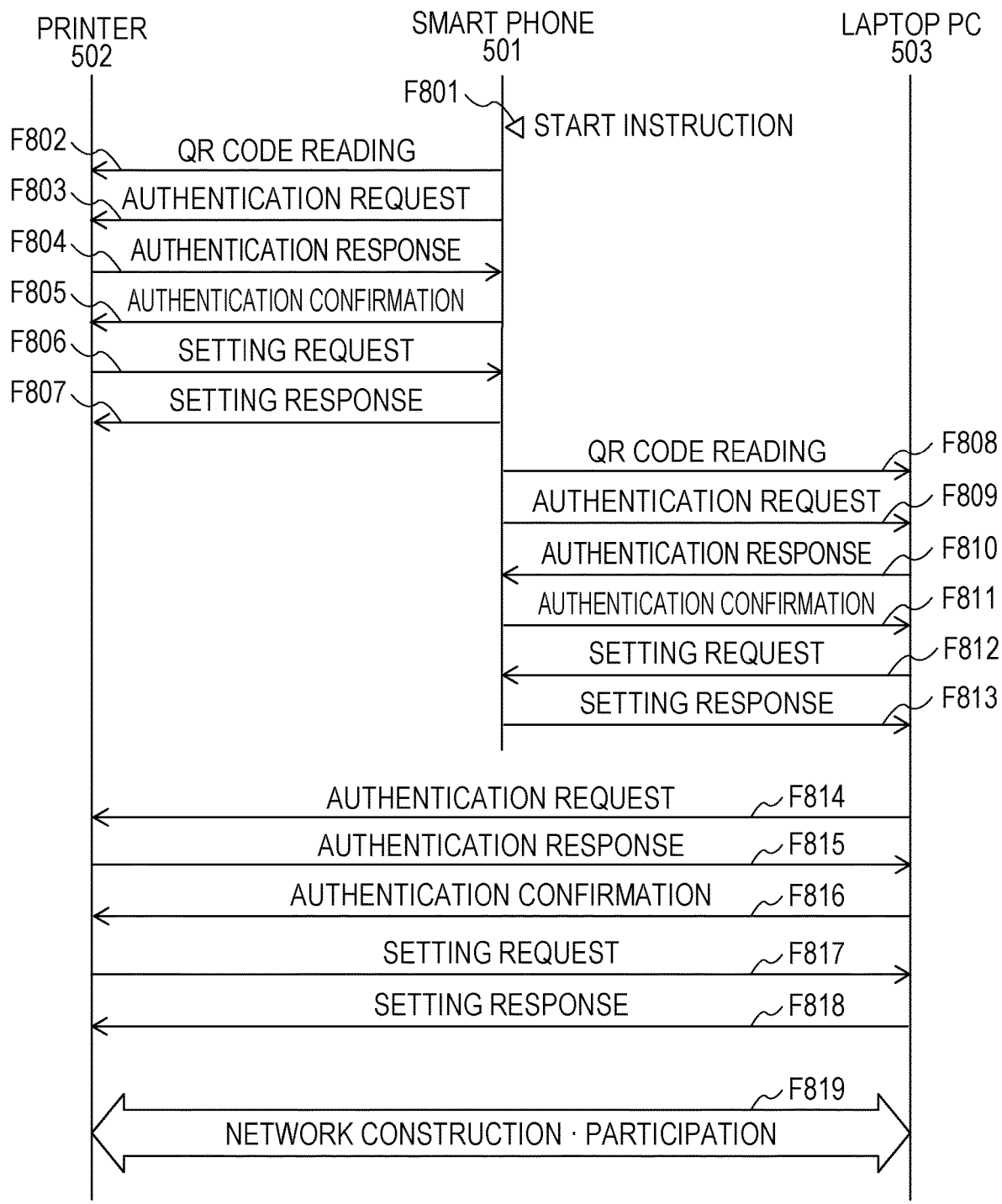
FIG. 8 is an operation sequence diagram between the setting device and the communication device according to the embodiment.

FIG. 8 illustrates a sequence of a processing operation executed among the smart phone 501, the printer 502, and the laptop PC 503.

The smart phone 501 receives an instruction for starting registration processing from the user (F801) and starts the flow illustrated in FIG. 6. Then, the QR code of the printer 502 is read to obtain the public key of the printer 502 and the identification information of the printer 502 (F802). The smart phone 501 calculates the hash value from the obtained public key and transmits the authentication request including the hash value to the printer 502 (F803). When the authentication request is received, the printer 502 executes the flow illustrated in FIG. 7 and transmits, in a case where the authentication is successful, the authentication response indicating the authentication success (F804). When the authentication response is received, the smart phone 501 transmits the authentication confirmation (F805). Then, to the setting request received from the printer 502 (F806), the setting response is transmitted (F807). The transmitted setting response includes the role of the printer 502 in the communication based on the WFD. In addition, the information of the communication channel used for the communication based on the WFD and the communication parameter for performing the communication based on the WFD may also be included.

After the setting response is transmitted in F807, the smart phone 501 reads the QR code of the laptop PC 503 and obtains the public key of the laptop PC 503 and the identification information of the laptop PC 503 (F808). The smart phone 501 calculates the hash value from the received public key and transmits the authentication request including the hash value to the laptop PC 503 (F809). When the authentication request is received, the laptop PC 503 executes the flow of FIG. 7 and transmits, in a case where the authentication is successful, the authentication response indicating the authentication success (F810).

When the authentication response is received, the smart phone 501 transmits the authentication confirmation (F811). To the setting request received from the laptop PC 503 (F812), the smart phone 501 transmits the setting response (F813). The transmitted setting response includes the role of the laptop PC 503 in the communication based on the WFD. In addition, the public key of the printer 502 and the identification information of the printer 502 are included. Furthermore, the information of the communication channel used for the communication based on the WFD and the communication parameter for performing the communication based on the WFD may also be included.

In each of F807 and F813, in a case where the communication parameter for performing the communication based on the WFD is included in the setting response transmitted from the smart phone 501, the processing in F814 to F818 is omitted, and the processing in F819 is performed. That is, the device operating as the role of the GO generates a network in accordance with the communication parameter notified from the smart phone 501, and the device operating as the role of the CL participates in the network, so that the network of the WFD is constructed (F819).

On the other hand, in a case where the communication parameter for performing the communication based on the WFD is not included in the setting response transmitted from the smart phone 501 in each of F807 and F813, the processing in F814 is performed. In the example of FIG. 8, a case will be described where it is notified from the smart phone 501 that the laptop PC 503 operates as the GO, and the printer 502 operates as the CL. After the setting response is received from the smart phone 501, the laptop PC 503 calculates the hash value of the public key of the printer 502 and transmits the authentication request including the hash value to the printer 502 (F814). In a case where the authentication request is received and the authentication processing is successful, the printer 502 transmits the authentication response indicating the authentication success (F815). When the authentication response is received, the laptop PC 503 transmits the authentication confirmation (F816). Then, to the setting request received from the printer 502 (F817), the laptop PC 503 encloses the communication parameter necessary for performing the communication based on the WFD in the setting response and transmits the setting response to the printer 502 (F818). Thereafter, the laptop PC 503 generates a network in accordance with the communication parameter of which the printer 502 is notified, and the printer 502 participates in the network, so that the network of the WFD is constructed (F819).

As described above, according to the present embodiment, even when the printer 502 and the laptop PC 503 are not provided with the reading function for the QR code, the connection of the WFD can be performed by the safer method using the public key when the smart phone 501 is used.

Second Embodiment

According to the first embodiment, the notification of the role in the WFD is performed each time the smart phone 501 reads the QR codes of the printer 502 and the laptop PC 503. In contrast to this, according to the present embodiment, after the smart phone 501 reads both of the QR codes of the printer 502 and the laptop PC 503, the respective devices are notified of the roles in the WFD. Hereinafter, a difference from the first embodiment will be described in detail. It should be noted that the configuration of the communication system, the configurations of the respective devices, and the operation flows of the printer 502 and the laptop PC 503 are similar to those of the first embodiment, and descriptions thereof will be omitted.

Figure 9:
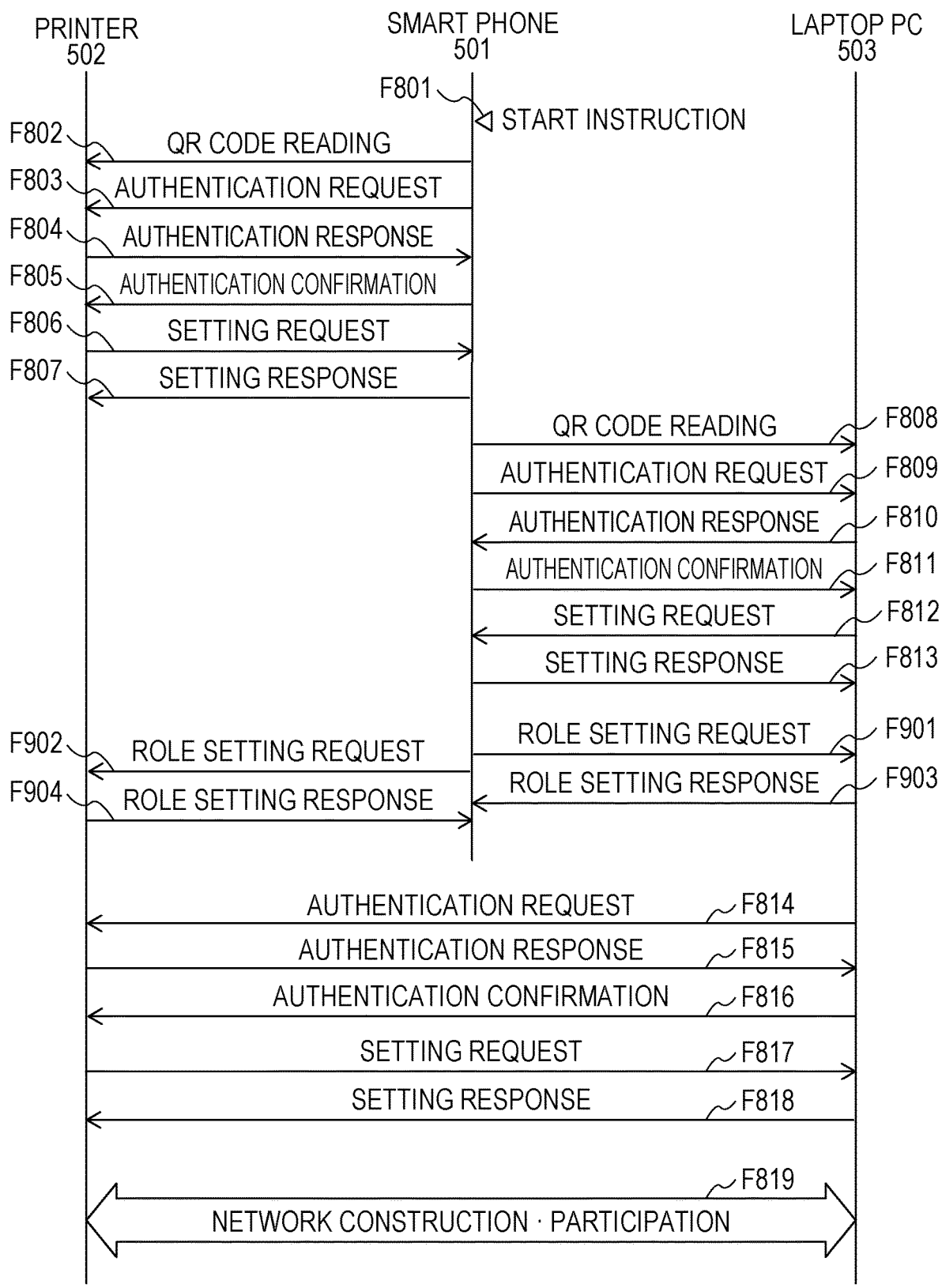
FIG. 9 is an operation sequence diagram between the setting device and the communication device according to a second embodiment.

FIG. 9 illustrates a sequence of a processing operation executed among the smart phone 501, the printer 502, and the laptop PC 503 according to the present embodiment.

A point different from FIG. 8 in the processing F801 to F813 is that the role in the WFD is not included in the information notified from the smart phone 501 in each of F807 and F813. In F807 and F813 in FIG. 9, the smart phone 501 notifies the information such as the SSID and the communication channel used when the printer 502 and the laptop PC 503 perform the communication of the WFD.

After F813, the smart phone 501 transmits a role setting request to each of the laptop PC 503 and the printer 502 (F901, F902). The role setting request includes the roles of the respective devices, which are decided by the smart phone 501, when the printer 502 and the laptop PC 503 perform the communication of the WFD. As the role decision method, similarly as in the first embodiment, the roles in the WFD may be decided on the basis of an order in which the QR codes are read. That is, the opposite device of which the QR code has been read earlier may be set as the GO, and the opposite device of which the QR code has been read later may be set as the CL, and the opposite order may also be adopted. Alternatively, information indicating a device type may be obtained from the QR code read from each of the printer 502 and the laptop PC 503 to decide the GO and the CL on the basis of the device type. For example, a decision method may be adopted in which the GO is preferentially set when the device type is a printer, the CL is preferentially set when the device type is a mobile terminal, or the like. Alternatively, an intent value standardized by the WFD standard may be obtained from the QR code read from each of the printer 502 and the laptop PC 503 to decide the GO and the CL on the basis of the intent value. Alternatively, the user may be asked to select which one is set as the GO and which one is set as the CL by the display unit of the smart phone 501 displaying the information of the opposite device where the QR code has been read.

The role setting request transmitted to the laptop PC 503 includes the identification information of the printer 502 and the public key of the printer 502. On the other hand, the role setting request transmitted to the printer 502 includes the identification information of the laptop PC 503 and the public key of the laptop PC 503. The respective devices including the laptop PC 503 and the printer 502 can recognize the opposite device that the laptop PC 503 or the printer 502 communicates with based on the WFD and the public key thereof on the basis of these pieces of information. In addition, since the role setting request transmitted from the smart phone 501 to the respective communication devices is encrypted by the encryption key shared by the respective communication devices, it is possible to safely notify the role setting request to the corresponding communication devices.

Each of the laptop PC 503 and the printer 502 that have received the role setting request transmits the role setting response to the smart phone 501 (F903, F904). The subsequent processing (F814 to F819) is similar to that of the first embodiment.

According to the present embodiment, similarly as in the first embodiment, even when the printer 502 and the laptop PC 503 are not provided with the reading function for the QR code, the connection of the WFD can be performed by the safer method using the public key when the smart phone 501 is used. In addition, when the roles in the WFD of the respective communication devices are to be decided, the smart phone 501 can make the decision after the information of the communication devices are obtained.

Other Embodiments

Each of the above-described respective embodiments can be combined, and the respective embodiments may also be selectively switched by the user depending on the setting or the like in the setting device. According to the respective embodiments, the example has been illustrated in which the subsequent communication after the setting device obtains the identification information and the public key from each of the communication devices is entirely performed using the communication based on the wireless LAN, but at least part of this communication may also be executed by another wireless communication such as Bluetooth.

In addition, according to the above-described embodiments, the example has been described in which the identification information and the public key of the device are obtained by using image capturing of the QR code, but instead of the capturing of the QR code, a wireless communication such as NFC or Bluetooth (registered trademark) may also be used. In addition, the other wireless communication such as IEEE 802.11ad or TransferJet (registered trademark) may also be used. In a case where a wireless communication is used to obtain the public key, security is desirably secured by an encrypted communication or the like in the wireless communication.

It should be noted that the device that is not provided with these distinct functions for obtaining the public key also includes a device that is in a setting or mode in which the functions are not currently used. That is, even when these particular functions are provided as the functions that the device itself has, the device in a state in which these function cannot be used as the current setting of the device is also regarded as the device that is not provided with these distinct functions for obtaining the public key. Alternatively, the device in a state in which these distinct functions cannot be currently used temporarily due to a failure of the device or the like is also regarded as the device that is not provided with these distinct functions.

In addition, according to the above-described embodiments, the QR code is an example of the image read by the setting device, and the read image is not limited to the QR code, and other images such as a one-dimensional barcode and a two-dimensional barcode other than the QR code may also be used. In addition, according to the above-described embodiments, the setting device may obtain the public key from the respective communication devices by another method. For example, the smart phone 501 may obtain the public key from the printer 502 by using the image capturing of the QR code and obtain the public key from the laptop PC 503 by a method (for example, NFC) other than the QR code.

The present invention can also be realized by processing in which a program that realizes one or more functions of the above-described embodiments is supplied to a system or a device via a network or a storage medium, and one or more processors in a computer of the system or the device read out and executes the program. In addition, the present invention can also be realized by a circuit (for example, an ASIC) which realizes one or more functions.

According to the present invention, it becomes possible for even the devices that are not provided with the distinct function for obtaining the public key to start the communication of the WFD by sharing the communication parameter.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication device comprising:
one or more memories configured to store a communication program; and
one or more processors configured to execute the communication program to function as:
first obtaining means for obtaining identification information and a public key of a first other communication device by a particular obtaining method that does not use a wireless LAN;
first notification means for notifying, in accordance with the obtainment by the first obtaining means, the first other communication device of a role of the first other communication device in a communication based on Wi-Fi Direct and a communication parameter used in the communication based on Wi-Fi Direct;
second obtaining means for obtaining identification information and a public key of a second other communication device by the particular obtaining method; and
second notification means for notifying, in accordance with the obtainment by the second obtaining means, the second other communication device of a role of the second other communication device in the communication based on Wi-Fi Direct and the communication parameter,
wherein one of the roles notified by the first notification means and the second notification means is a P2P Group Owner and the other one is a P2P Client, and the communication based on Wi-Fi Direct is enabled between the first other communication device and the second other communication device based on the notifications.

2. The communication device according to claim 1, wherein the first notification means notifies the first other communication device of the role before the second obtaining means obtains the identification information and the public key of the second other communication device.

3. The communication device according to claim 1, wherein the first notification means notifies the first other communication device of the role after the second obtaining means obtains the identification information and the public key of the second other communication device.

4. The communication device according to claim 1, wherein the second notification means performs notification of the identification information of the first other communication device.

5. The communication device according to claim 1, further comprising:
first transmission means for transmitting an authentication request to the first other communication device by using the public key obtained by the first obtaining means; and
second transmission means for transmitting an authentication request to the second other communication device by using the public key obtained by the second obtaining means, wherein
the first notification means performs the notification to the first other communication device in a case where authentication processing based on the authentication request transmitted by the first transmission means is successful, and the second notification means performs the notification to the second other communication device in a case where authentication processing based on the authentication request transmitted by the second transmission means is successful.

6. The communication device according to claim 1, further comprising
reading means for reading an image,
wherein the particular obtaining method is an obtaining method of obtaining information from the image read by the reading means.

7. The communication device according to claim 6, wherein the image is either a barcode or a two-dimensional code.

8. The communication device according to claim 1, further comprising
decision means for deciding the respective roles of the first other communication device and the second other communication device in the communication based on Wi-Fi Direct in accordance with an order of the obtainment by the first obtaining means and the obtainment by the second obtaining means, wherein the first notification means and the second notification means perform the notification of the roles decided by the decision means.

9. The communication device according to claim 1, wherein the first notification means and the second notification means perform the notification by using the wireless LAN.

10. The communication device according to claim 1, wherein the first notification means and the second notification means respectively notify the first other communication device and the second other communication device of a communication channel used in the communication based on Wi-Fi Direct as the communication parameter.

11. The communication device according to claim 1, wherein the first notification means and the second notification means respectively notify the first other communication device and the second other communication device of at least one of an encryption method, an encryption key, an authentication method, an authentication key and a network identifier as the communication parameter.

12. A communication method comprising:

a first obtaining step of obtaining identification information and a public key of a first communication device by a particular obtaining method that does not use a wireless LAN;

a first notification step of notifying, in accordance with the obtainment by the first obtaining step, the first communication device of a role of the first communication device in a communication based on Wi-Fi Direct and a communication parameter used in the communication based on Wi-Fi Direct;

a second obtaining step of obtaining identification information and a public key of a second communication device by the particular obtaining method; and a second notification step of notifying, in accordance with the obtainment by the second obtaining step, the second communication device of a role of the second communication device in the communication based on Wi-Fi Direct and the communication parameter, wherein, one of the roles notified in the first notification step and the second notification step is a P2P Group Owner and the other one is a P2P Client, and the communication based on Wi-Fi Direct is enabled between the first communication device and the second communication device based on the notifications.

13. A non-transitory computer-readable storage medium storing computer executable instructions causing a communication device to execute the following steps:

a first obtaining step of obtaining identification information and a public key of a first communication device by a particular obtaining method that does not use a wireless LAN;

a first notification step of notifying, in accordance with the obtainment by the first obtaining step, the first communication device of a role of the first communication device in a communication based on Wi-Fi Direct and a communication parameter used in the communication based on Wi-Fi Direct;

a second obtaining step of obtaining identification information and a public key of a second communication device by the particular obtaining method; and a second notification step of notifying, in accordance with the obtainment by the second obtaining step, the second communication device of a role of the second communication device in the communication based on Wi-Fi Direct and the communication parameter, wherein, one of the roles notified in the first notification step and the second notification step is a P2P Group Owner and the other one is a P2P Client, and the communication based on Wi-Fi Direct is enabled between the first communication device and the second communication device based on the notifications.

\* \* \* \* \*